UNITED STATES PATENT OFFICE.

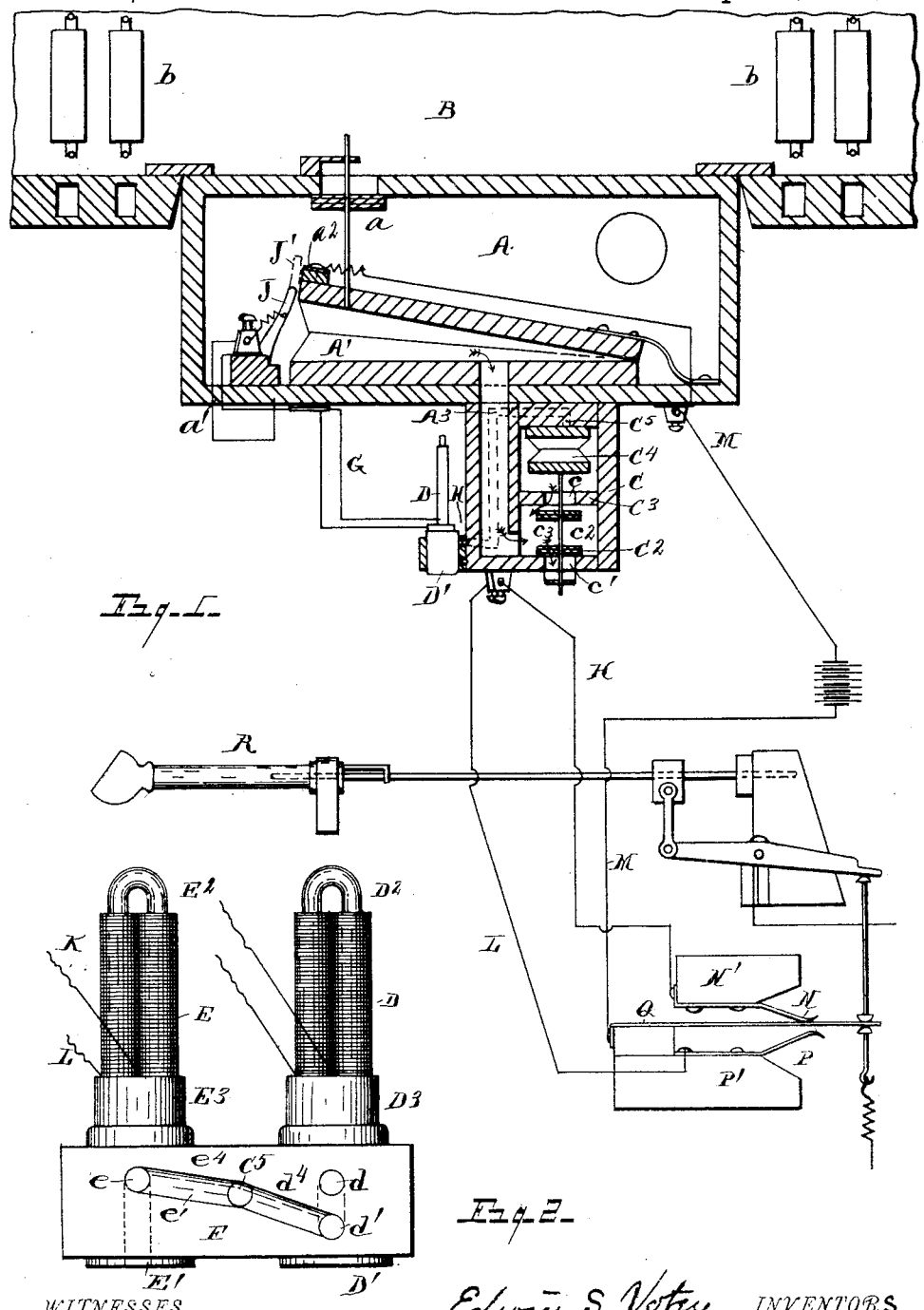

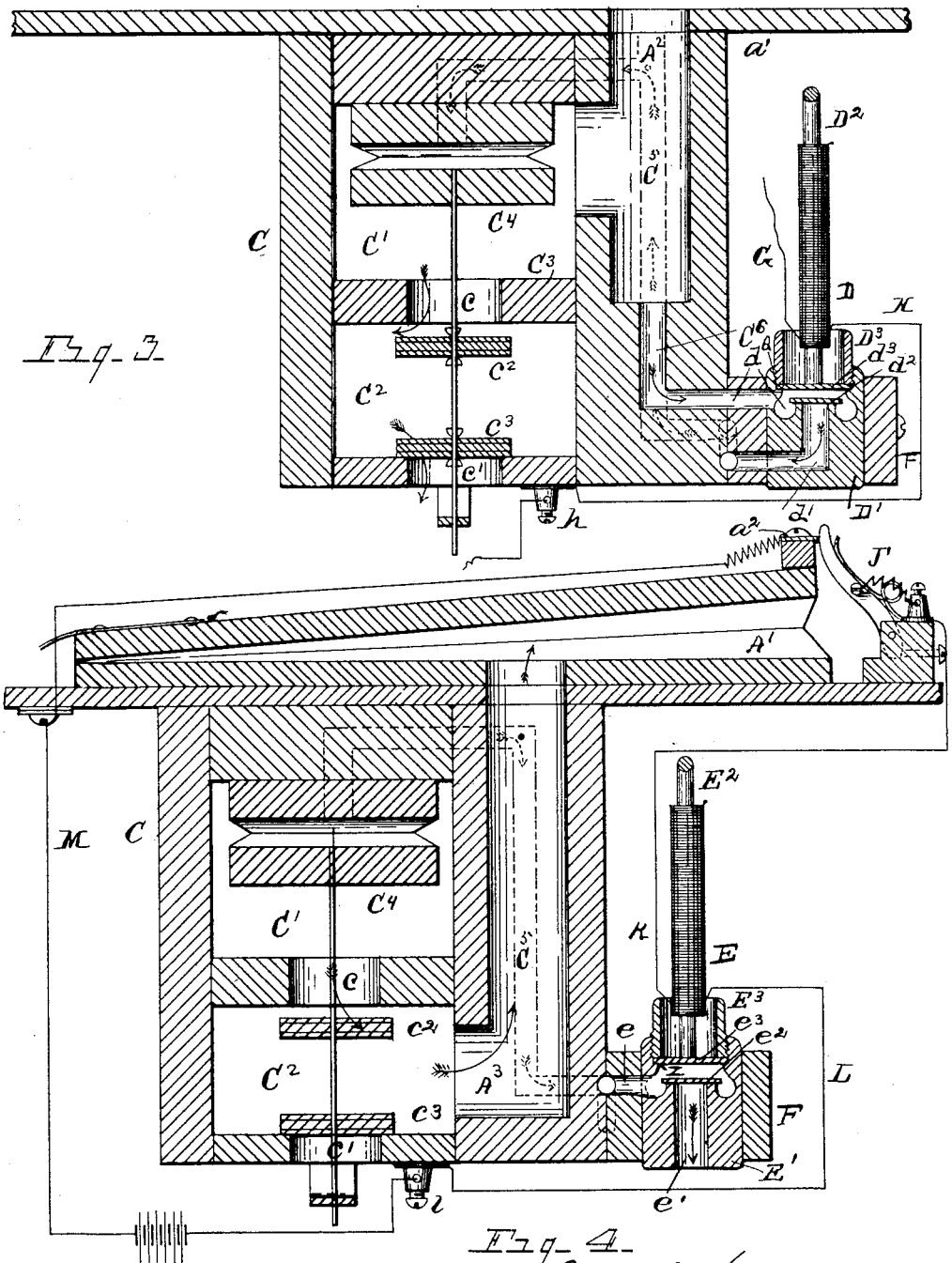

EDWIN S. VOTEY, WILLIAM B. FLEMING, AND WILLIAM D. WOOD, OF DETROIT, MICHIGAN.

ELECTROMAGNET FOR PIPE-ORGANS.

SPECIFICATION forming part of Letters Patent No. 536,977, dated April 2, 1895.

Application filed April 7, 1894. Serial No. 506,715. (No model.)

*To all whom it may concern:*

Be it known that we, EDWIN S. VOTEY, WILLIAM B. FLEMING, and WILLIAM D. WOOD, citizens of the United States, residing at Detroit, county of Wayne, State of Michigan, have invented a certain new and useful Improvement in Electric Magnets for Pipe-Organs, &c.; and we declare the following to be a full, clear, and exact description of the invention, such as will enable others skilled in the art to which it appertains to make and use the same, reference being had to the accompanying drawings, which form a part of this specification.

Our present invention relates to a certain new and useful improvement in an electric magnet for pipe organs. The same is also particularly designed to be used in connection with a stop action magnet box embodied in a separate application filed simultaneously herewith, Serial No, 507,785, the magnet forming the subject matter of this application being employed as a supply governing magnet, whereby the air inlet passage to a pneumatic in the stop action magnet box is governed by throwing the magnet into an electrical circuit at the will of the operator.

Our invention consists of the construction, combination and arrangement hereinafter described and pointed out in the claims, and illustrated in the accompanying drawings, in which—

Figure 1 is a general diagram view of a device embodying our invention, showing parts in vertical section. Fig. 2 is a rear elevation of the supply and exhaust controlling magnets, the same being shown detached from the stop action magnet box. Fig. 3 is a vertical section through the supply controlling magnet, and Fig. 4 is a vertical section through the exhaust controlling magnet.

The exhaust controlling magnet is shown in connection herewith, to more clearly illustrate the operation of the supply controlling magnet in relation thereto forming the subject matter of this application, the exhaust controlling magnet being substantially embodied in a separate application filed simultaneously herewith, Serial No. 506,711. Let it be understood that the supply controlling magnet electrically controls the admission of air into a pneumatic in the stop action magnet box, while the exhaust controlling magnet electrically controls the exhaust of said pneumatic.

We will now proceed to describe our invention.

A is a wind trunk provided with a pneumatic $A'$ operating a valve "$a$" controlling the admission of air from the wind trunk into a wind chest or passage B.

C is a stop action magnet box constructed with two wind chambers $C'$ and $C^2$, the two chambers being separated by a partition $C^3$, in which is an exhaust passage "$c$," a passage "$c'$" also leading from the chamber $C^2$. An air passage $A^2$ leads from the base "$a'$" of the wind trunk into the chamber $C'$ and an air duct $A^3$ leads from the chamber $C^2$ into the pneumatic $A'$.

$C^4$ is a pneumatic located in the chamber $C'$ of the stop action magnet box controlling valves "$c^2$" and "$c^3$," the one governing the channel "$c$" in the partition $C^3$ and the other governing the passage "$c'$" leading from the chamber $C^2$. A passage $C^5$ admits air into the pneumatic $C^4$ through which channel also the pneumatic $C^4$ exhausts.

D denotes our supply governing magnet and E denotes our exhaust controlling magnet. These magnets are supported upon the stop action magnet box by a bracket support F. The supply magnet is constructed with a cup $D'$ engaged in the bracket support provided with a channel "$d$" communicating with a channel $C^6$ leading into the passage $A^2$ and communicating also with a channel "$d'$," leading into the channel $C^5$. The communication of the channels "$d$" and "$d'$" is controlled by an armature "$d^2$." The magnet is constructed with a core $D^2$ wound with conductors G and H. The poles of the magnet are preferably united by a plate "$d^3$," held in place by a cap $D^3$. It will be perceived that when the armature "$d^2$" is in normal position, it closes the communication between the channels "$d$" and "$d'$." When, however, the magnet is in electrical circuit the armature is lifted thereby opening the communication between the channels "$d$" and "$d'$." The conductor H leads to a binding post "$h$" and the conductor G is connected to an oscillating lever J within the wind trunk A. The exhaust controlling magnet E is constructed with a cup E' formed with a channel "$e$" communicating with the channel $C^5$ and with a channel "$e'$" leading to the exterior, the communication of the channels "$e$" and "$e'$," however, being controlled by an armature "$e^2$." The magnet is constructed with a core $E^2$ wound with conductors K and L. The conductor K leads to an oscillating lever J', and the conductor L leads to a binding post "$l$."

It will be observed that when the magnet E is in electrical circuit, the armature "$e'$" will be lifted opening communication from the pneumatic $C^4$ through the channels $C^5$, "$e$" and "$e'$," allowing said pneumatic to exhaust. The poles of the core $E^2$ may be united by a plate "$e^3$" held in place by a cap $E^3$. The bracket F may have formed between it and the stop action magnet box, a channel "$d^4$" connecting the channel "$d'$" with the channel $C^5$ and also with a channel "$e^4$" connecting the channel "$e'$" with the channel $C^5$.

The pneumatic A' is constructed with a contact strip "$a^2$" with which a battery wire M is connected. It will be perceived that the levers J and J' are of different lengths, the lever J' forming contact with the strip "$a^2$" when the pneumatic A' is inflated, in which position the contact of the lever J with said strip is broken. When, however, the pneumatic A' exhausts contact between the strip "$a^2$" and the lever J' is broken and contact is formed between said strip and the lever J, the lever J being in electrical contact with the conductor G of the supply controlling magnet and the lever J' being in electrical contact with the conductor K of the exhaust controlling magnet. As the pnematic A' is inflated and exhausted, contact is made alternately therefore with the levers J and J', whereby the supply controlling magnet and exhaust controlling magnet are alternately thrown into and out of electrical connection with the contact strip "$a^2$," the pneumatic A' serving to make and break contacts with the levers J, J'. The conductor H of the supply controlling magnet is in electrical connection with a spring bar N, mounted upon a block N'. The conductor L of the exhaust controlling magnet is in electrical connection with a spring bar P supported upon a block P'.

Q denotes a spring bar in electrical connection with the battery wire M.

R is a stop suitably connected with the spring bar Q by intermediate mechanism, whereby when the stop R is in or out the spring bar Q will be brought into electrical connection either with the spring bars N or P. In this manner either the supply controlling magnet or exhaust controlling magnet is thrown into electrical circuit as the stop is manipulated.

The mode of operating the pneumatic A' to close the valve "$a$" is as follows: We will suppose the organ action to be in operative position, in which case, of course, the valve "$a$" is open and the pneumatic A' is exhausted. To throw the organ action into inoperative position, the stop draw R should of course be pushed in, closing the circuit controlling the supply magnet D to inflate the pneumatic $c^1$ and consequently the pneumatic A' thereby closing the valve "$a$." The circuit controlling the supply magnet, it will be obvious, is as follows, the stop draw being pushed in, viz: from bar Q through the contact piece N, conductor H, magnet D, conductor G, contact bar J, the contact piece $a^2$, battery wire M, back to the bar Q. When the pneumatic A' is inflated closing the valve "$a$," the contact piece $a^2$ comes in contact with the bar J'. This closes at this point the circuit controlling the exhaust magnet E, placing it in readiness to be closed at the point Q, P, by drawing out the stop-knob R when it is desired to throw the stop on and open the valve "$a$," and vice versa. We do not, however, limit ourselves to the particular mechanism herewith shown and described for throwing the exhaust controlling magnet or the supply controlling magnet into electrical circuit, as any means may be employed for this purpose within the scope of our invention.

It will be perceived that the plate "$d^3$" is made solid so as to close the base of the cap $D^3$, so that no air can pass therethrough. Both the passages "$d$," "$d'$" are preferably led to the cup D on the same side thereof.

We do not limit our invention to this precise connection and combination of parts, as we contemplate its use to any purpose to which it may be found adapted.

The passage B is provided with valves "$b$" controlling communication with pipes, not shown.

We prefer to construct the cup D' with a cap $B^3$ of metal, as of brass. The cup D' is constructed with a flange or seat Q' upon which the plate "$d^3$" seats, the cup E' being provided with a similar flange at Z, upon which the plate "$e^3$" rests.

The cup D' and cap $D^3$ form in reality a case within which the armature is located. It will be perceived that the plate "$d^3$" with the magnet wire is firmly held in place by the cap $D^3$ engaged thereupon. The parts are accurately made and related one to the other, and since the construction is of metal there can be no shrinking or swelling, and consequently the parts are never liable to get out of order.

What we claim as our invention is—

1. An electrical magnet constructed with a metal cup or base provided with channels "$d$" and $d'$ communicable one with another and opening through said cup upon the same side thereof, an armature located within said cup to control the communication of said channels, a magnet core and its windings to attract said armature, and a cup having a threaded engagement upon said base to support said core and its windings, substantially as described.

2. An electrical magnet constructed with a metal cup or base D' provided with communicable channels "$d$" and $d'$, a metal cap $D^3$ closed at its base engaged upon said cup, an armature controlling the communication of the channels "$d$" $d'$, and means to attract said armature, substantially as described.

3. An electrical magnet constructed with a metal cup or base D' provided with communicable channels "$d$" and $d'$ and with a flange or seat toward one end thereof, an armature controlling the communication of the channels "$d$" and $d'$, a magnet core and its windings having its poles united by a closed plate seated upon said flange, and a metal cap $D^3$ engaged with the cup D' over said plate to hold said plate to its seat, substantially as described.

In testimony whereof we sign this specification in the presence of two witnesses.

EDWIN S. VOTEY.
WILLIAM B. FLEMING.
WILLIAM D. WOOD.

Witnesses:
CALVIN W. GIBBS,
N. S. WRIGHT.